United States Patent
Nakajima et al.

(10) Patent No.: US 6,842,301 B2
(45) Date of Patent: *Jan. 11, 2005

(54) ND FILTER AND APERTURE DEVICE INCLUDING THE SAME

(75) Inventors: Katsura Nakajima, Nirasaki (JP); Kazuhiro Fukasawa, Minamialps (JP); Nobutaka Kumada, Odawara (JP)

(73) Assignee: Nisca Corporation, Yamanashi-Ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/600,528

(22) Filed: Jun. 23, 2003

(65) Prior Publication Data

US 2004/0027706 A1 Feb. 12, 2004

(30) Foreign Application Priority Data

Jun. 28, 2002 (JP) ........................................ 2002-190705

(51) Int. Cl.⁷ ................................................. G02B 5/22
(52) U.S. Cl. ......................... 359/888; 359/885; 396/108
(58) Field of Search .......................... 359/885, 888–889, 359/892; 396/108, 544; 427/385.5

(56) References Cited

U.S. PATENT DOCUMENTS

| 3,897,140 A | * | 7/1975 | Tuthill ......................... 359/888 |
| 5,715,103 A | * | 2/1998 | Amano et al. ............... 359/888 |
| 5,726,797 A | * | 3/1998 | Zhang et al. ................ 359/350 |
| 6,671,109 B2 | * | 12/2003 | Kunii .......................... 359/888 |

\* cited by examiner

Primary Examiner—Leo Boutsikaris
(74) Attorney, Agent, or Firm—Manabu Kanesaka

(57) ABSTRACT

An ND filter includes a substrate formed in a plastic sheet and a deposit film deposited on a surface of the substrate. The plastic sheet is composed of a norbornene resin and the deposit film is composed of a nickel-chromium alloy. The norbornene resin has a small thermal shrinkage factor and prevents the plastic sheet from wrinkling. The nickel-chromium alloy has a good oxidation resistance and ensures a uniform light transmittance of the deposit film over the entire visible light region.

6 Claims, 7 Drawing Sheets

ND FILTER AND APERTURE DEVICE INCLUDING THE SAME

BACKGROUND OF THE INVENTION AND RELATED ART STATEMENT

The present invention relates to an ND (neutral density) filter including a plastic sheet substrate and a deposited film on the substrate, and also relates to an aperture device including the ND filter.

An aperture device used in a lens optical system such as a still camera and video camera includes an ND filter formed in a sheet to prevent hunting of an aperture blade and low resolution by diffraction at a small diaphragm opening. Lately, a resolution of a camera has been increased and a size of a camera has been decreased. In such cases, when an ND filter having a uniform light transmittance is used, it may be difficult to effectively prevent the diffraction due to a steep change in a light intensity when the filter enters the aperture opening. Accordingly, it has been proposed to provide an ND filter with various light transmittances changed stepwise.

An ND filter is generally disposed to be movable in a lens optical system. Therefore, it is necessary to use a thin and light material for the ND filter. The ND filter is generally formed in a plastic sheet, so that it is easy to form in a desired shape corresponding to an aperture opening. Such ND filters include a filter in which a plastic material containing an organic dye or pigment is formed in a sheet to provide a desired optical characteristic, and a filter in which a film is deposited on a surface of a transparent plastic material to provide a desired optical characteristic.

In particular, the filter having the deposited film exhibits a high anti-reflection effect at a surface of the filter through a combination of deposited layers. Thus, the filter is effective in reducing a ghost in the lens optical system. Further, it is possible to provide a filter having various areas with various light transmittances changed stepwise, so that the film can reduce transmittance without a steep change in the transmittance, thereby preventing the diffraction more effectively.

As a conventional filter, Japanese Patent Publication (KOKAI) No. 10-133253 has disclosed a ND filter in which a deposited film is formed on a plastic sheet. The ND filter uses polyethylene terephthalate (PET) and polyethylene naphthalate (PEN) as the plastic sheet, and titanium oxide and aluminum oxide are deposited on the plastic sheet as the deposited films.

In the conventional ND filter, the plastic sheet is formed of PET and PEN having a relatively large thermal shrinkage factor (thermal shrinkage factor is equal to 0.5%/150° C.·30 min). Therefore, when the sheet is exposed to a high-temperature atmosphere for a long period of time in a deposition step, a surface of the sheet tends to have wrinkles due to thermal shrinkage. In a severe case, the deposited film may be peeled off from the plastic sheet due to a difference in thermal shrinkage factors between the deposited film and the plastic sheet.

It is known that a plastic sheet is susceptible to heat. Accordingly, a temperature of a vacuum deposition chamber is maintained as low as possible. However, there is a case in which a plastic sheet is heated up to about 120° C. due to heat when an electron gun heats and melts a deposited material or when the plastic sheet is heated to securely adhere the deposit film to obtain a desired light transmittance. In production of the ND filter with various light transmittances changed stepwise, it is necessary to repeat the deposition step several times, thereby exposing the plastic sheet in a high-temperature environment for a longer period of time.

In the conventional ND filter described above, the deposited film is formed of titanium oxide as a layer for absorbing light. When the titanium oxide is exposed to the atmosphere from the high temperature environment in the deposit chamber, there is a risk in which the titanium oxide is oxidized and the light transmittance thereof relative to a certain wavelength changes. It is necessary for the ND filter to possess a uniform transmittance over the visible light region. Therefore, the oxidation must be strictly controlled. In production of the ND filter with the light transmittance changed stepwise, it is necessary to take the filter out from the chamber to change a mask, thereby increasing a possibility of the oxidation and making it difficult to strictly control the oxidation.

In view of the problems described above, an object of the present invention is to provide an ND filter formed of a plastic sheet with a low thermal shrinkage factor as a substrate to prevent wrinkle even after long exposure to a high temperature environment. The filter has a deposited film with good oxidation resistance to obtain a uniform transmittance over the visible light region. It is also easy to control the oxidation in the deposition step.

Further objects and advantages of the invention will be apparent from the following description of the invention.

SUMMARY OF THE INVENTION

In order to attain the objects described above, according to the present invention, an ND filter includes a substrate formed of a plastic sheet of a norbornene resin; and a deposited film formed of a nickel-chromium alloy formed on a surface of the substrate.

The norbornene resin has preferable properties for the ND filter, i.e. at least 90% of transmittance in visible light and 0.5% or less of turbidity. Further, the resin has a significantly low thermal shrinkage factor (thermal shrinkage factor is equal to 0.1%/150° C.·30 min). Therefore, it is possible to reduce wrinkles due to thermal shrinkage when the sheet is exposed to a high-temperature environment for a long period of time. Also, a difference in the thermal shrinkage factors between the sheet and the deposited film is small, thereby effectively preventing delamination of the deposited film.

In the present invention, a preferred nickel-chromium alloy is Chromel, i.e. an alloy of 90% nickel and 10% chromium. In production of an ND filter having different light transmittance regions, it is necessary to repeat deposition steps in which the plastic sheet is moved in and out a deposition chamber to change various masks. Chromel has a high oxidation resistance against such environment change. Therefore, the resulting film has a uniform light transmittance over the entire visible light region.

In the present invention, the deposit film may be formed with any one of vacuum deposition, ion plating and sputtering.

According to the present invention, an aperture device is provided with a ND filter having a plastic sheet substrate formed of a norbornene resin and a deposit film formed of a nickel-chromium alloy formed on a surface of the substrate.

DETAILED DESCRIPTION OF PREFERRED EMBODIMENTS

Figure 1:
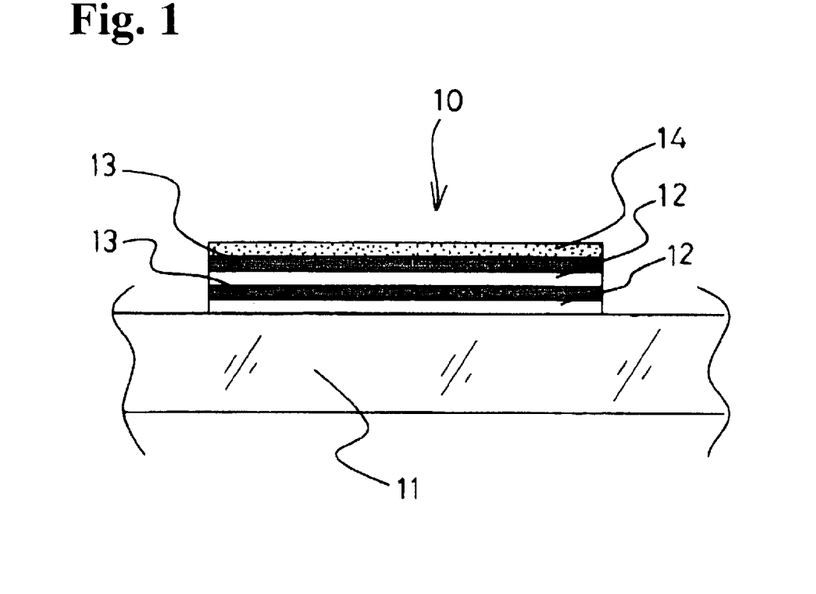
FIG. 1 is a cross-sectional view showing a structure of an ND filter according to the present invention.
Figure 2:
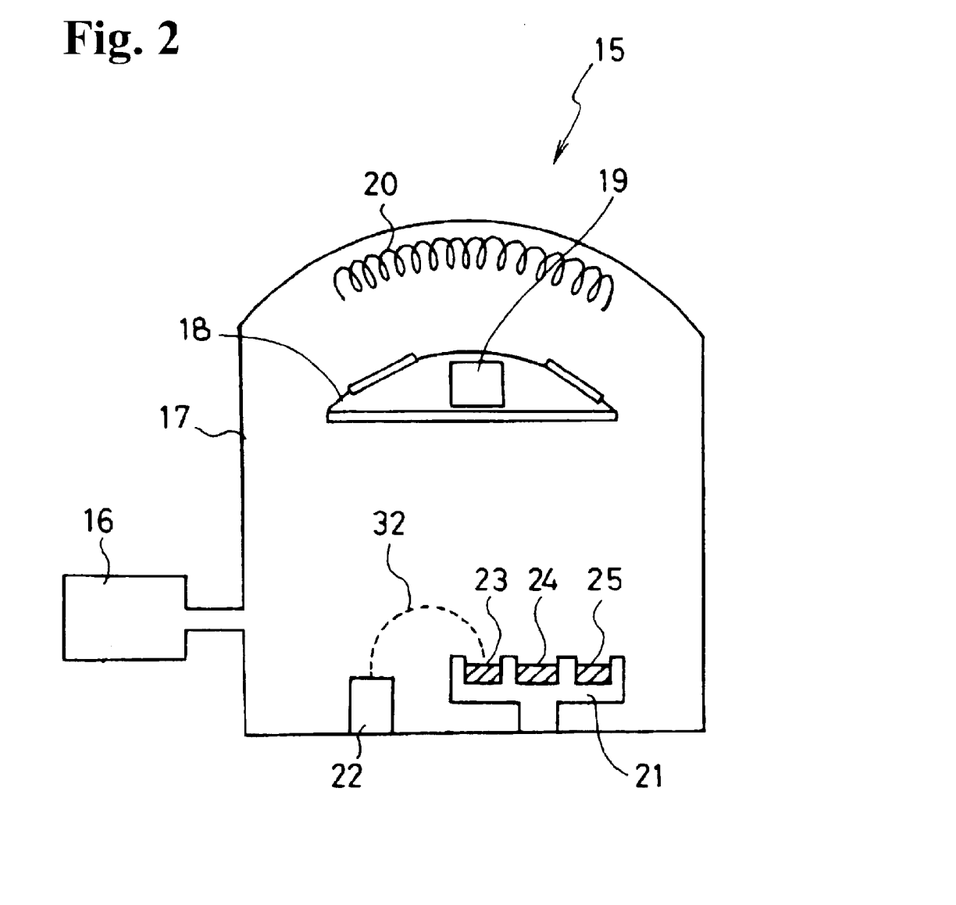
FIG. 2 is a schematic view of a vacuum deposition chamber for producing the ND filter according to the present invention.
Figure 3:
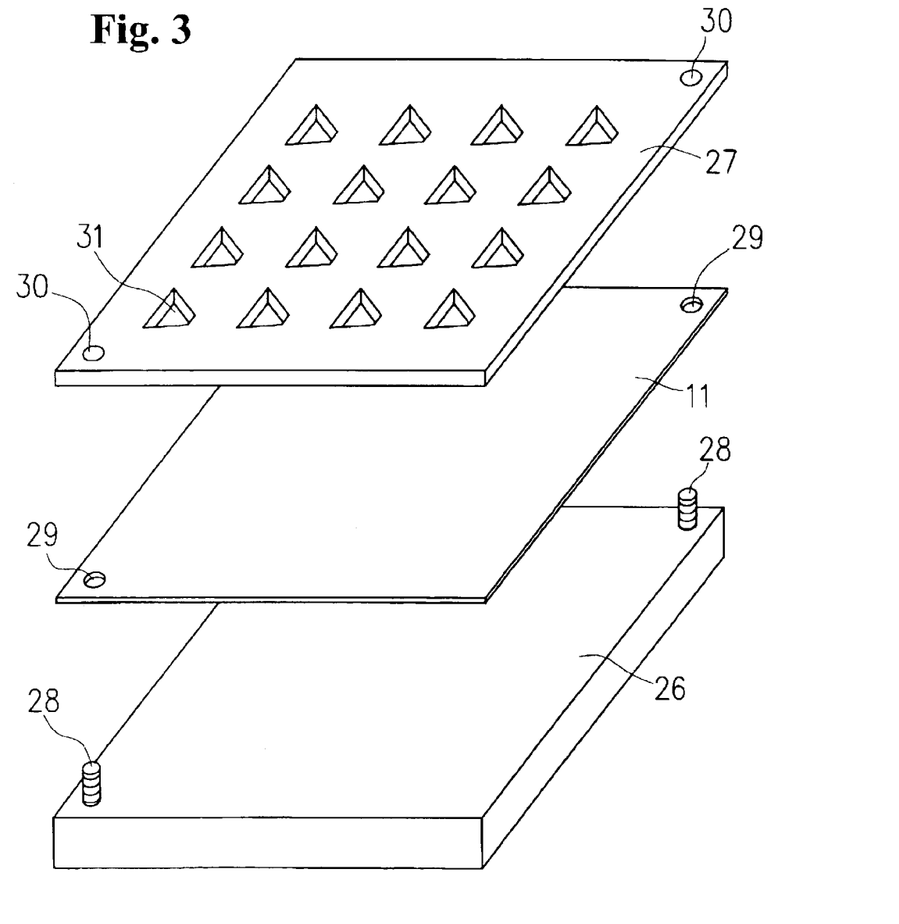
FIG. 3 is a perspective view showing a geometric relationship between a transparent plastic sheet and a mask plate relative to a fixing plate.

Hereunder, embodiments of the present invention will be described in detail with reference to the accompanying drawings. FIG. 1 is a cross-sectional view showing a structure of an ND filter according to the present invention; FIG. 2 is a schematic view of a vacuum deposition chamber for producing the ND filter according to the present invention; and FIG. 3 is a perspective view showing a geometric relationship between a transparent plastic sheet and a mask plate relative to a fixing plate.

As shown in FIG. 1, a transparent plastic sheet 11 as a substrate generally has a thickness in a range of about 25 $\mu$m to 200 $\mu$m, and preferably in a range of 50 $\mu$m to 100 $\mu$m. A sheet with a thickness less than 25 $\mu$m exhibits low rigidity, which causes delamination of a deposit film composed of a fragile dielectric material when the transparent plastic sheet 11 is bent. A sheet with a thickness larger than 200 $\mu$m exhibits high turbidity, which causes noticeable light scattering leading to flare in the optical system when the sheet is used as a filter.

In the present invention, the transparent plastic sheet 11 is primarily composed of a norbornene resin or a material containing the norbornene resin. The norbornene resin exhibits a significantly low thermal shrinkage factor, at least 90% of light transmittance, and 0.5% or less of turbidity (haze value), which are suitable properties for the optical filters. Furthermore, the norbornene resin has a glass transition temperature of 120° C., which is higher than a temperature for heating the transparent plastic sheet 11 in the vacuum deposition chamber. Such a high glass transition temperature effectively prevents the sheet from wrinkling.

As shown in FIG. 1, according to the present invention, an ND filter 10 includes the transparent plastic sheet 11. A Chromel layer 12 and a silicon dioxide (SiO$_2$) layer 13 are alternately deposited on the substrate. A hard magnesium fluoride (MgF$_2$) layer 14 is formed on the top. The Chromel layer 12 is formed of a deposition material composed of 90% nickel and 10% chromium, and forms a colored deposited film with a light absorption characteristic. The Chromel film is not readily oxidized even when the film is exposed to a high-temperature environment for a long period of time in the deposition step, or even when the transparent plastic sheet 11 is exposed to the atmosphere several times in a series of deposition steps. As a result, the Chromel film does not adversely affect optical characteristics of the filter.

The deposit films may be formed with vacuum deposition, ion plating, or sputtering. The films preferably have a thickness in a range of about 0.5 $\mu$m to 1.0 $\mu$m. It is possible to adjust the light transmittance through the thickness of each film and the number of the films deposited. An alloy of nickel and chromium other than Chromel may be used for forming the deposit film having optical characteristics similar to those of the Chromel film. In particular, an alloy containing at least 90% nickel is preferred.

The silicon dioxide film 13 has an anti-reflection effect, and a combination of the Chromel film 12 and the silicon dioxide film 13 can surely prevent reflection in the visible wavelength region. The uppermost hard magnesium fluoride film 14 provides the surface hardness of the ND filter 10 at a required level.

A method for producing the ND filter according to the present invention will be described next with reference to a vacuum deposition chamber 15 shown in FIG. 2. The vacuum deposition chamber 15 has a deposition chamber 17 connected to a vacuum pump 16. A hemispherical rotary table 18 is provided in an upper space in the deposition chamber 17, and a deposition member 19 is placed on the rotary table 18. A heater 20 is provided above the rotary table 18 to heat the deposition member 19. The deposition chamber 17 is also provided with a crucible 21 for retaining a deposition material at a bottom thereof and an electron gun 22 adjacent to the crucible 21. The crucible 21 has three recesses on an upper surface thereof for retaining granular deposition materials, i.e. Chromel 23, silicon dioxide 24, and magnesium fluoride 25.

As shown in FIG. 3, the deposition member 19 placed on the rotary table 18 includes a flat fixing plate 26 directly fixed to a surface of the rotary table 18, the transparent plastic sheet 11 having a size substantially the same as that of the flat fixing plate 26, and a mask plate 27 for holding the transparent plastic sheet 11 together with the flat fixing plate 26. The flat fixing plate 26 has bolts 28 at two diagonal corners, and the transparent plastic sheet 11 and the mask plate 27 have positioning holes 29 and 30 at positions corresponding to the bolts 28.

The mask plate 27 is provided with a plurality of openings 31 arranged in two-dimensional arrays and having a shape corresponding to that of the ND filter for producing a plurality of the ND filters. The transparent plastic sheet 11 and the mask plate 27 are placed and fixed to the flat fixing plate 26 in that order by screwing nuts (not shown) to the bolts 28, so that the mask plate 27 is closely attached to the transparent plastic sheet 11.

When the mask plate 27 is formed in a metal plate, it is possible to closely attach the mask plate 27 to the transparent plastic sheet 11 merely by placing on the transparent plastic sheet 11 with its own weight. It is possible to attach further closely by fastening with the bolts and nuts as described above, by using a spring, or by using a magnet between the flat fixing plate 26 and the mask plate 27. When the mask plate 27 closely contacts the transparent plastic sheet 11 in such a way, it is possible to effectively prevent the deposit film from smearing around a periphery of the opening 31.

After the deposition member 19 is placed on the rotary table 18, the deposition chamber 17 is sealed and evacuated by a vacuum pump 16 while the heater 20 heats the transparent plastic sheet 11 of the deposition member 19 up to about 120° C. After the vacuum in the deposition chamber 17 reaches a predetermined level, the electron gun 22 radiates an electron beam 32 to heat the Chromel 23 and the silicon dioxide 24 alternately so that these materials are alternately deposited on the deposition member 19. After repeating the deposition steps, the magnesium fluoride 25 is heated and deposited on the top surface of the deposition member 19. These materials are deposited in the order shown in FIG. 1 on the transparent plastic sheet 11 of the deposition member 19 only in regions defined by the openings 31 of the mask plate 27.

Figure 4A:
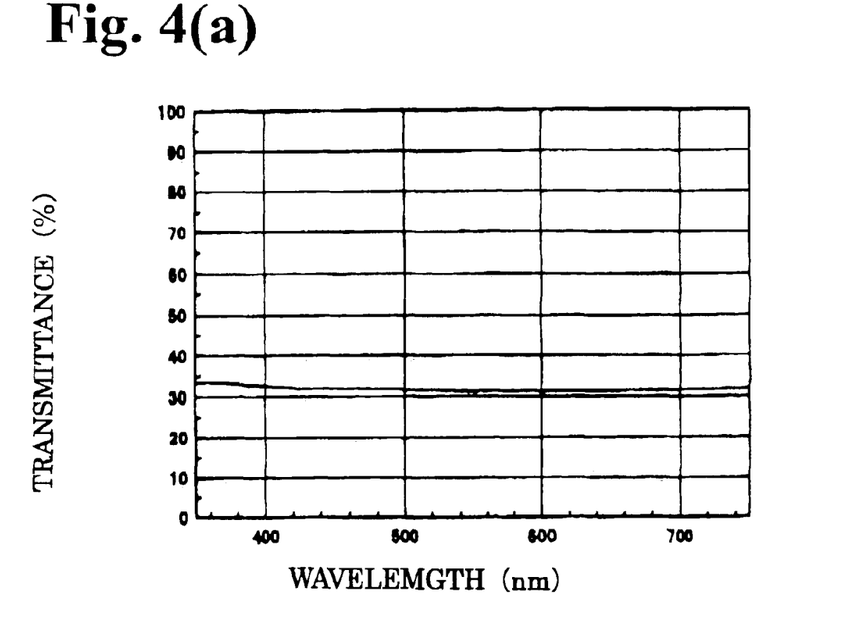
FIGS. 4(a) and 4(b) are graphs showing optical characteristics of the ND filter according to the present invention.
Figure 4B:
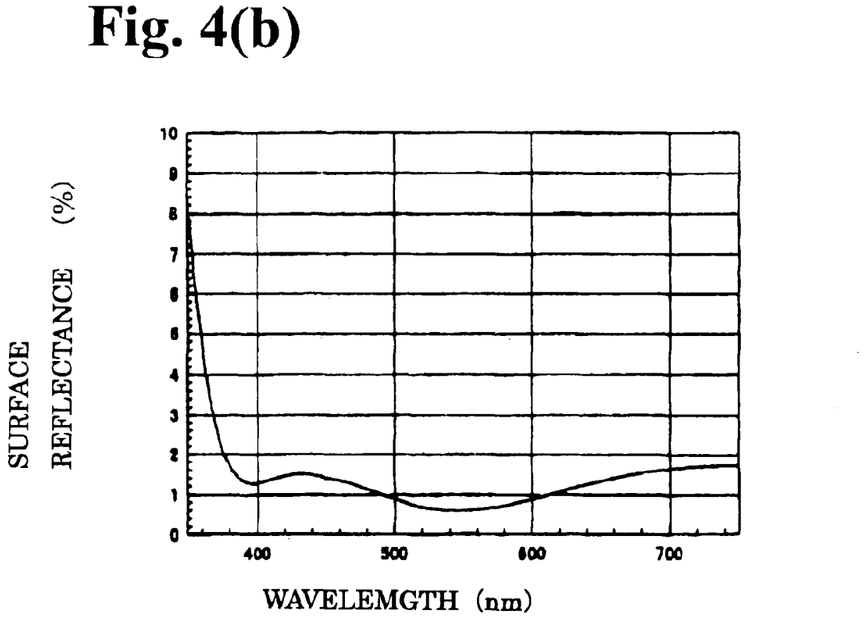

FIG. 4(a) is a graph showing a relationship between transmittance and wavelength of the deposited films, and FIG. 4(b) is a graph showing a relationship between surface reflectance and wavelength of the filter 10. The deposit films used in the measurement were simultaneously prepared in the process for preparing the ND filter 10. FIG. 4(a) shows that the transmittance is almost constant at about 30% over the wavelength range of 400 nm to 700 nm with no wavelength dependence. FIG. 4(b) shows that the surface reflectance is extremely low, i.e. 2% or less, over the wavelength range of 400 nm to 700 nm, and thus is a practical level.

Figure 5:
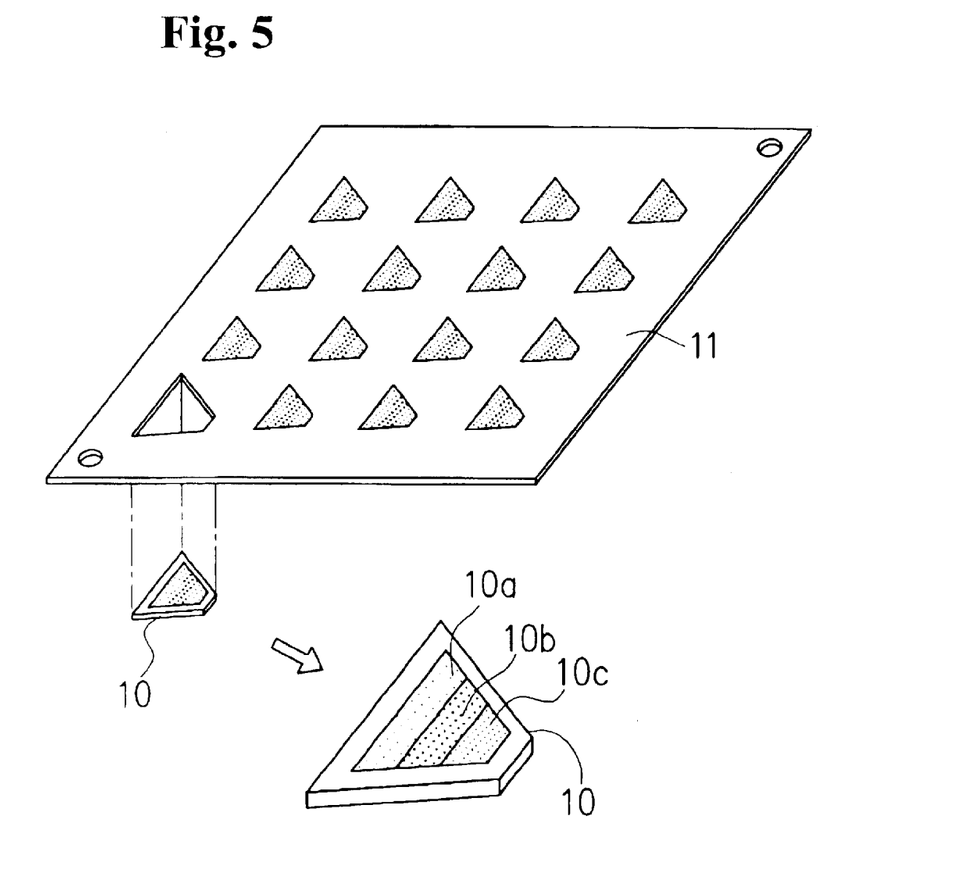
FIG. 5 is a perspective view showing a transparent plastic sheet on which a plurality of the ND filters with regions having different light transmittances is formed.

FIG. 5 shows a transparent plastic sheet 11 on which a plurality of the ND filters with three different light transmittance regions is formed. As shown in FIG. 5, the ND filters 10 are formed by punching out portions provided with the deposit films. The ND filter 10 has three regions 10a, 10b, and 10c having different light transmittances, and may be formed, for example, by three mask plates 27a, 27b, and 27c shown in FIG. 6. The first mask plate 27a has an opening 31a corresponding to all three regions 10a, 10b, and 10c. The second mask plate 27b has an opening 31b corresponding to two regions 10b and 10c, and the third mask plate 27c has an opening 31c corresponding to only one region 10c.

Figure 6:
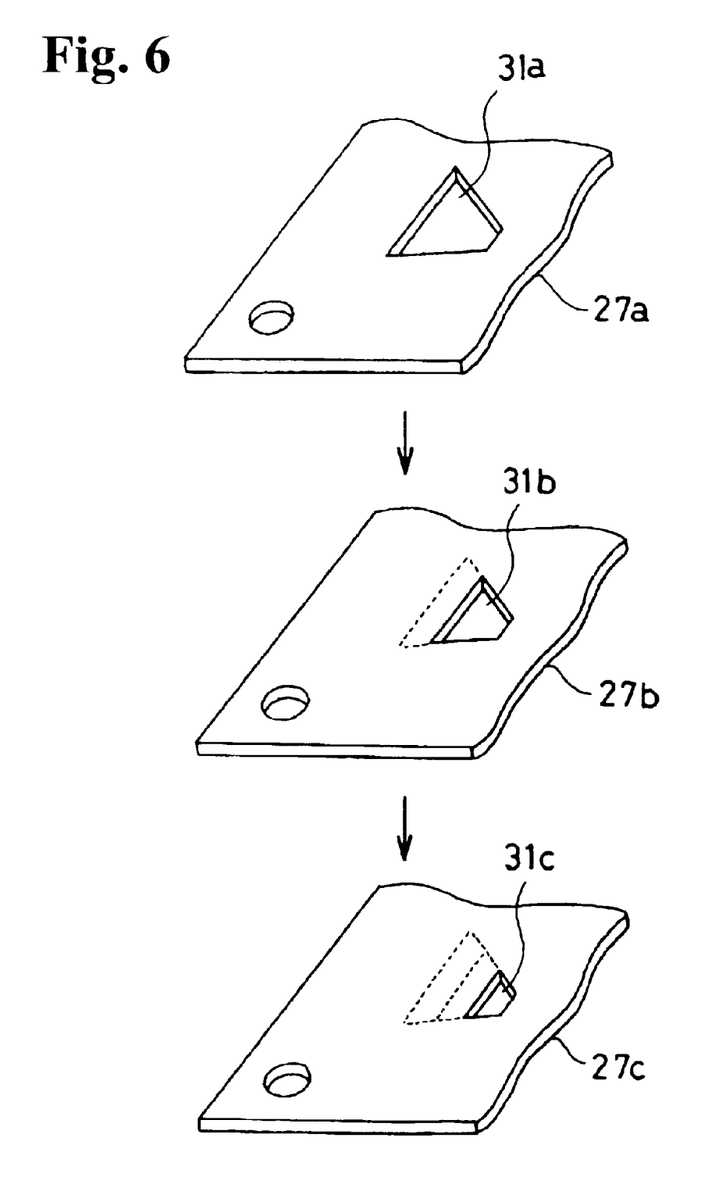
FIG. 6 is a schematic view showing three mask plates having openings with different shapes for producing the ND filter shown in FIG. 5.

In the first deposition step through the first mask plate 27a, all regions 10a, 10b, and 10c are subjected to the deposition. In the second deposition step through the second mask plate 27b, two regions 10b and 10c are subjected to the deposition. In the third deposition step through the third mask plate 27c, only the region 10c is subjected to the deposition. As a result, these three regions have different numbers of the deposited layers and different light transmittances stepwise.

In production of the ND filter with different light transmittance regions, the three mask plates 27a, 27b, and 27c must be changed in that order during the deposition process. It is necessary to take out the deposition member 19 from the deposition chamber 17 to change the mask plates. As described above, Chromel is not readily oxidized in such a condition. Thus, the deposited films have desirable optical properties as shown in FIG. 4.

Figure 7:
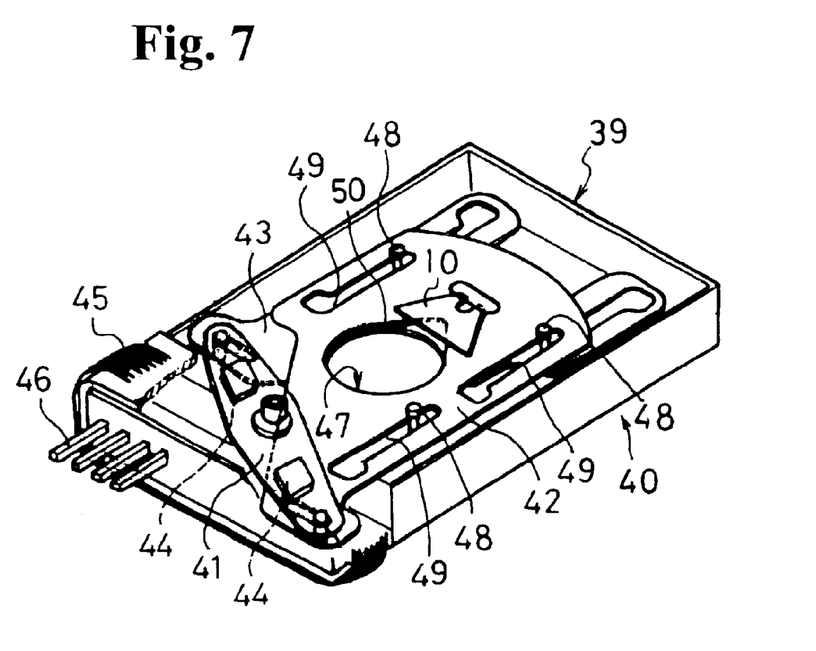
FIG. 7 is a perspective view showing an aperture device including the ND filter according to the present invention.

FIG. 7 shows an aperture device 39 provided with the ND filter 10 mounted in a compact video camera or digital camera for adjusting exposure. The aperture device 39 includes a base 40, an arm 41, the first aperture blade 42, the second aperture blade 43, a pair of magnets 44, an excitation coil unit 45 having a driving coil and a control coil, terminals for electrically connecting the driving coil and the control coil to an external device, and a magnetic sensor (not shown) for detecting a position of the magnet and an aperture ratio. The base 40 has an exposure hole 47 at the center thereof and guide pins 48 on the right and left sides thereof. These guide pins 48 control the aperture blades 42 and 43 to slide on the right and left sides.

Each of the first and second aperture blades 42 and 43 has long slits 49 for guiding the guide pins 48 and an aperture opening 50 having a shape substantially the same as that of the exposure hole 47. The ND filter 10 is slidably disposed to partly cover the aperture opening 50. The first aperture blade 42 and the second aperture blade 43 are mutually slid to adjust the light intensity passing through the exposure hole 47. At a small diaphragm opening, the ND filter 10 slides toward the exposure hole 47 to slightly adjust the light transmittance of the exposure hole 47.

While the invention has been explained with reference to the specific embodiments of the invention, the explanation is illustrative and the invention is limited only by the appended claims.

What is claimed is:

1. An ND filter comprising:
    a substrate formed of a plastic sheet composed of a norbornene resin; and
    a deposit film composed of a nickel-chromium alloy and deposited on a surface of the substrate.

2. An ND filter according to claim 1, wherein said deposit film is composed of Chromel.

3. An ND filter according to claim 1, wherein said deposit film is formed of a Chromel layer and a silicon dioxide layer alternately deposited on the substrate, and a magnesium fluoride layer formed on a top of the deposit film.

4. An ND filter according to claim 1, wherein said filter has a plurality of regions having different light transmittances, said plurality of the regions having a different number of the deposit films.

5. An ND filter according to claim 4, wherein said deposited film is composed of Chromel.

6. An aperture device comprising the ND filter according to claim 1.

* * * * *